Dec. 8, 1959  F. W. YOUNG  2,916,291
WHEEL MOUNTING FOR NESTING TYPE STORE SERVICE TRUCK
Filed Feb. 20, 1958  4 Sheets-Sheet 1

INVENTOR
FRED W. YOUNG

BY
ATTORNEY

Dec. 8, 1959   F. W. YOUNG   2,916,291
WHEEL MOUNTING FOR NESTING TYPE STORE SERVICE TRUCK
Filed Feb. 20, 1958   4 Sheets-Sheet 2
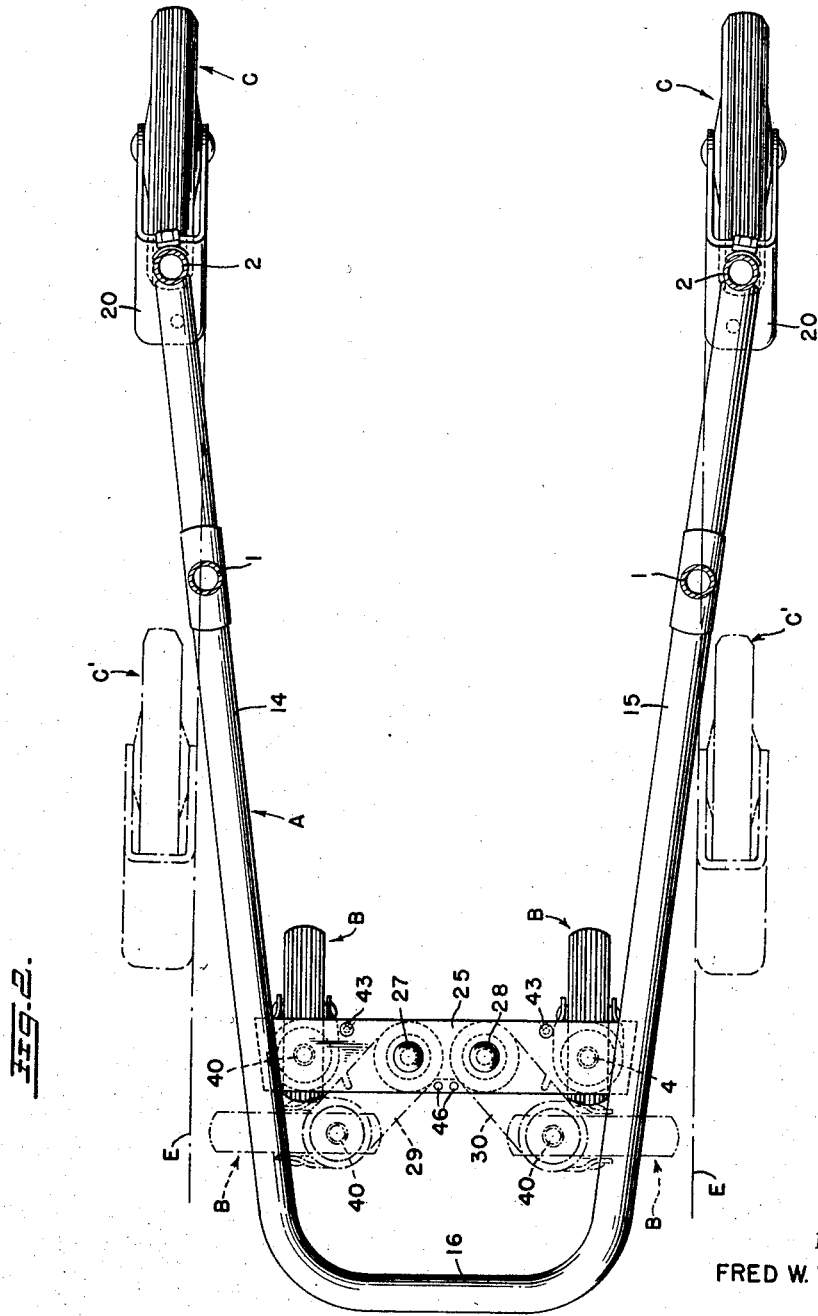
INVENTOR
FRED W. YOUNG
BY Ralph L. Bassett
ATTORNEY Dec. 8, 1959   F. W. YOUNG   2,916,291
WHEEL MOUNTING FOR NESTING TYPE STORE SERVICE TRUCK
Filed Feb. 20, 1958   4 Sheets-Sheet 3
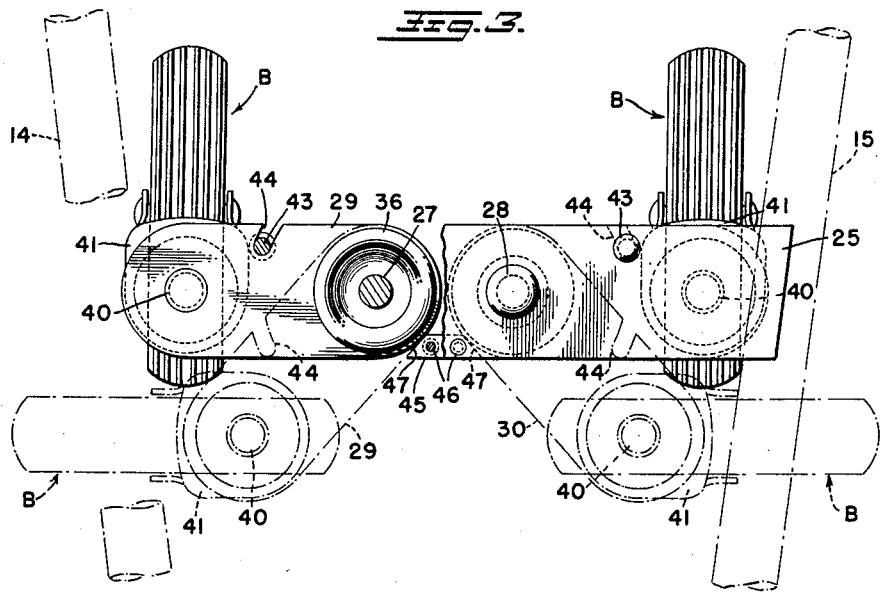
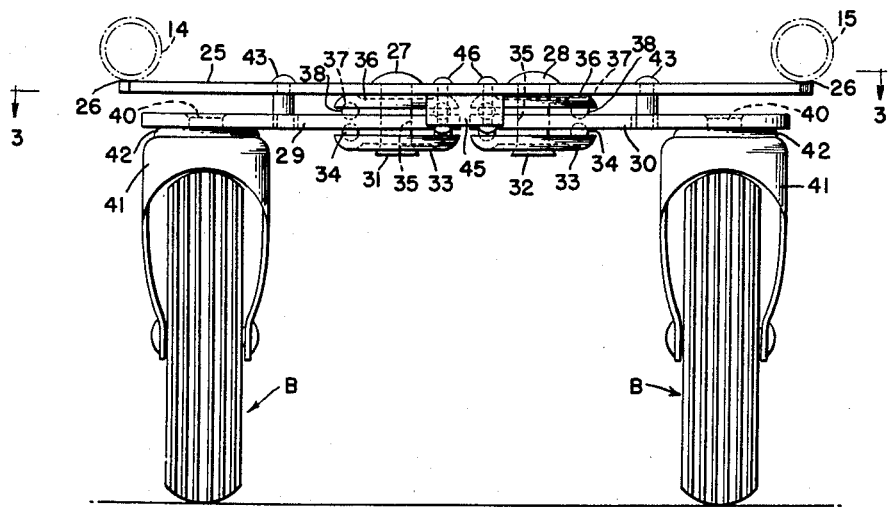
INVENTOR
FRED W. YOUNG
BY *Ralph T. Barrett*
ATTORNEY Dec. 8, 1959  F. W. YOUNG  2,916,291
WHEEL MOUNTING FOR NESTING TYPE STORE SERVICE TRUCK
Filed Feb. 20, 1958  4 Sheets-Sheet 4

INVENTOR
FRED W. YOUNG

BY Ralph L. Bassett
ATTORNEY

United States Patent Office 2,916,291
Patented Dec. 8, 1959

2,916,291

WHEEL MOUNTING FOR NESTING TYPE STORE SERVICE TRUCK

Fred W. Young, Oklahoma City, Okla., assignor to Sylvan N. Goldman, Oklahoma City, Okla.

Application February 20, 1958, Serial No. 716,447

9 Claims. (Cl. 280—33.99)

This invention relates to improvements in telescoping carts of the general type shown in Goldman Patent No. 2,689,133, dated September 14, 1954. The present invention comprehends improvements in the mounting of the front casters, this mounting being of such a character as to automatically modify the caster position when carts are being maneuvered into and out of telescopic association with carts of similar construction.

More specifically the present invention provides a swinging swiveled mount for the front casters of a telescoping cart, the swinging swiveled mount being so constructed and arranged that the axles of the swiveled wheels will be shiftable laterally inwardly and outwardly to provide clearance with respect to the horn structure of the rear wheel mountings of associated carts.

A further object of the invention is to provide a swinging swiveled mount for the front wheels of a telescoping cart, the swinging swiveled mount being incorporated in a unit assembly of such a character that it may be removed and replaced as a unit, thereby permitting its use as a replacement as well as in initial installations.

These and other objects of the invention will more clearly hereinafter appear by reference to the accompanying drawings forming a part of the instant application, wherein like characters of reference designate corresponding parts throughout the several views, in which:

Fig. 2 is a top plan view of the undercarriage;

Fig. 3 is an enlarged fragmentary plan view showing one form of the invention;

Fig. 4 is an end view of the structure of Fig. 3;

Figure 1:
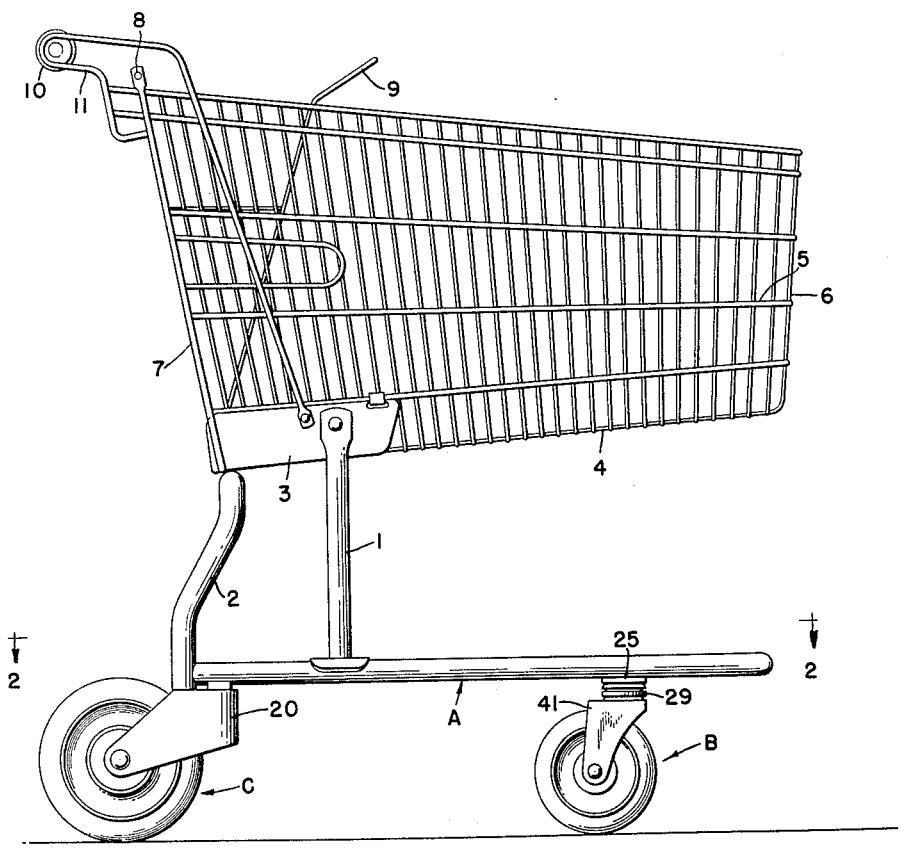
Fig. 1 is an elevation of a telescoping grocery cart embodying the present invention.

Conventional telescoping grocery carts include an underframe generally indicated at A which is normally mounted on front swiveled casters B and rear fixed rollers C. The underframe has front uprights 1 and rear uprights 2 which support side brackets 3 upon which the telescoping basket is mounted. The telescoping basket includes an inclined bottom 4, forwardly converging side walls 5, an end wall 6, and pivoted rear gate 7, the latter being hinged at 8. These carts may include a baby seat generally indicated at 9 and are provided with handles 10 carried by laterally spaced supports 11 of any suitable form. The bottom underframe may include forwardly converging side frame members 14 and 15 (Fig. 2) formed of tubular material, the side frames 14 and 15 constituting the arms of a U-shaped structure, the base 16 of which forms the forward end of the frame assembly.

Telescoping grocery carts are designed to facilitate maximum telescopic association so that when not in use they will require as little floor space as possible for storage, it being understood that it is conventional in a store to have on hand for the use of customers a large number of telescoping carts which are generally telescopically assembled at a convenient spot for customer use, the customer removing from a stack of telescoped similarly constructed carts the one most conveniently available for the handling of purchases while in the store. To aid maneuvering of the carts by the customers, it is conventional to have the front casters or rollers B swivel mounted, while the rear rollers C are carried in fixed horns or housings 20 which are rigidly associated with the frames in such a manner that the axes of the wheels are at right angles to a longitudinal center line through the telescoping cart assembly.

It has been found that inasmuch as the front casters are swiveled and are of substantial diameter they may move to a position transverse of the carriage structure when the carts are assembled and disengaged from their stacked association, and when the front casters are so shifted to transverse position due to manipulation of the carts they may in some instances, when their casters are mounted on fixed axes, tend to engage and lock with the rear casters or caster horns or housings of a cart which is in telescopic association therewith. In other words, the outer circumference of the front casters, if turned at right angles, may tend to engage the horn or housing of the rear wheels of another cart when two carts are being associated or disassociated in stacked relation.

Referring now to Fig. 2, the rear wheels of a telescopically associated cart are indicated at C' with the dotted lines E representing the inside dimension of these rear wheels. From this view it will be apparent that should the axles of the swiveled casters at the front of one carriage swing about their axes to substantially transverse positions with respect to the carriage, they would be in a position to engage with the inner faces of the horns or housings of the rear wheels of the other cart, particularly inasmuch as customers are inclined to separate telescoped associated carts without regard to their alignment. In other words, with the front casters fixed there is not a large amount of clearance available between these casters when transversely positioned, and the inner faces of the rear casters of an associated cart and they can readily jam and cause a locking of carts to prevent their proper telescopic association or separation from such association.

In the disclosures of Figs. 2, 3 and 4, there is shown the first form of the present invention and in this disclosure the front swiveled wheels are carried as a unit on a mounting plate 25 which may be welded or otherwise secured at points 26 to the side frame members 14 and 15. This mounting plate may be of any suitable dimension and structure, in the present disclosure being in the form of a rectangular bar of sufficient rigidity to support the assembly. Inwardly of the ends of the mounting plate 25 there is supported a pair of hinge pins 27 and 28, these pins being equally spaced from each end of the mounting plate 25 and extending downwardly for supporting the hinge links 29 and 30 and the roller bearing assemblies associated therewith. The lower extremities of the hinge pins 27 and 28 are enlarged to provide shoulders at 31 and 32, these shoulders supporting the lower bearing cage 33 having a raceway for supporting the balls 34 upon which the links 29 and 30 are mounted, the links being formed with central openings 35 for the passage of the hinge pins 27 and 28. Similar bearing cages 36 are provided between the upper faces of the links 29 and 30, these cages being provided with raceways 37 in which the balls 38 are mounted.

By this arrangement the links 29 and 30 are hingedly supported on the hinge pins 27 and 28 and are retained between roller bearings to permit their free horizontal swinging movement. It will be noticed that the bearings are relatively large, having a diameter closely approximating the width of the links so as to provide maximum support for the links in all of their positions.

The outer ends of the links 29 and 30 are provided with depending swivels 40 which carry the wheel supports or wheel horns 41 and suitable bearings 42 are interposed between the supports 41 and the adjacent end surfaces of the links 29 and 30, so as to permit the wheels to swing freely on their mountings. Stop pins 43 are fixed to and depend from the mounting plate 25 and are so positioned that they will be received within the angular slots 44 in the links to lock the links against inward movement beyond a predetermined position, this position approximating a point which will prevent the links from swinging rearwardly of a center line of the supporting bracket. A center stop in the form of a plate 45 is secured by rivets 46 medially of the supporting plate and at its front edge portion to limit the movement of the links forwardly. It will be noted that this stop is provided with angular faces 47 which are adapted to abut the adjacent faces of the links when swung outwardly to provide an elongated point of engagement between the parts.

By this construction and arrangement the swiveled wheels B are free to swing about their swiveled mountings 40 and are likewise free to swing about the pivotal mountings 27 and 28 which carry the links 29 and 30, this latter movement being restricted in accordance with the arrangement of the rear stop 43 and the front stop 45.

Figure 5:
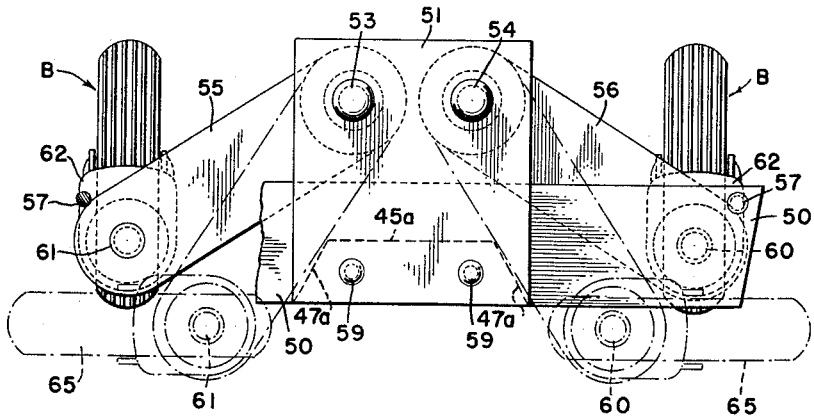
Fig. 5 is an enlarged fragmentary top plan view of a modified form of the invention.
Figure 6:
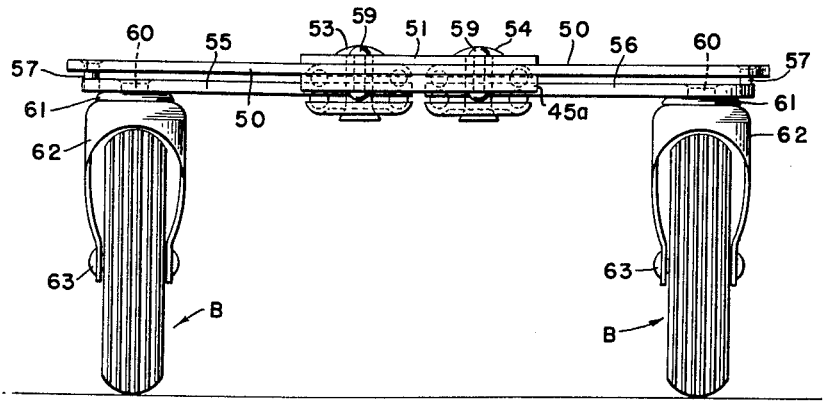
Fig. 6 is an end view of the structure of Fig. 5.

In the modification of Figs. 5 and 6, the supporting links are pivoted rearward of the axis of the axles of the casters B rather than forwardly of the axis of the axles of the casters as in the modification of Figs. 3 and 4. In the modification of Figs. 5 and 6, the supporting mounting plate 50 will have its ends welded or otherwise secured to the front portion of the side frames 14 and 15 (not shown in this modification) and medially of the supporting mounting plate 50 is a superimposed square plate 51 secured by welding or otherwise at its front portion to the medial portion of the mounting plate 50. The plate 51 is provided with depending pivot pins 53 and 54 upon which the links 55 and 56 are hinged, the hinge mounting of the inner ends of the links 55 and 56 and the pin structures 53 and 54 being identical to the mounting shown in the disclosure of Figs. 3 and 4, including bearing raceways above and below the links mounted on the pin with the enlarged head. The links 55 and 56 are suspended beneath the support 50 and are free to swing between the outer stops 57 located at the rear end portions of the supporting mounting plate 50 and the inner stop or plate 45ᵃ secured by rivets 59 which extend through the square plate 51 and the mounting plate 50, as shown in Fig. 5. The stop or plate 45ᵃ includes inwardly converging faces 47ᵃ against which the links 55 and 56 abut when swung inwardly. The outer marginal edge of plate 45ᵃ which is secured by the rivets 59 extends to the outer surface of the mounting plate 50, as shown in Fig. 6. The plate 45ᵃ projects sufficiently below the support to project in the path of movement of the links to arrest the swinging movement of the links inwardly. The outer ends of the links support the swivel pins 60, the bearings 61 and the horns or housings 62, the latter carrying the axle pins 63 on which the wheels B are mounted. By this structure the wheels are free to swivel about the bearings 61 and the swivel pins 60 carried by the ends of the links 55 and 56 are capable of inward swinging movement between the stops 57 and faces 47ᵃ of the plate 45ᵃ. This inward swinging movement will move the wheels inwardly so that if the wheels are positioned transversely of the vehicle, as shown at 65 in dotted lines in Fig. 5, they will not project laterally a sufficient distance to engage or lock with the horns of the rear wheels of an associated telescoped cart.

In both of the structures described it will be noted that the inward swinging movement of the links 29 and 30 or 55 and 56 and the retraction of the swiveled wheels or casters B forming the front support for the cart frame inherently occur when the cart is moved rearwardly which is the normal movement in the separation of two carts when in telescoped associated relation. The inward swinging movement is limited by the stops 45 in the form of Figs. 3 and 4 and the plate 45ᵃ in the modification of Figs. 5 and 6. Forward movement of the cart will result in the wheel supporting links swinging rearwardly on their bearings against the rear stops which places the wheels in their normal lateral position for providing maximum support for the forward end of the cart. It is also to be noted that the present mountings provide not only clearance between the front wheels of one cart and the rear wheels or horns of the rear cart, but also provide a more flexible wheel mounting which will facilitate the manipulation of the cart by a customer during progress through a store.

What I claim is:

1. In a telescoping cart assembly including a supporting frame and a basket carried thereby, said basket including forwardly tapered sidewalls and a rear hinged gate, supporting wheels for said cart, said supporting wheels including a pair of laterally spaced rear wheels fixed to said frame with their axes at right angles to the center line of the frame, and a pair of swivel wheels at the front end of the frame, said swivel wheels being positioned inwardly of the rear wheels, whereby the front of one cart assembly is capable of telescopic association with a cart of similar construction and when so associated the front swivel wheels of the inner cart extend forwardly of the rear wheels of the outer cart, the invention comprising means mounting the front wheels on said frame including supporting links pivoted to said frame inwardly of the axes of the axles of the front wheels for movement laterally in both directions and in a horizontal plane, said swivel front wheels being supported on the outer end portions of said links, and stop means for limiting the swinging movement of said links in both directions, whereby the front swivel wheels are movable laterally inwardly and outwardly to positions freely clearing the same from engagement with the rear outer wheels of a telescoped associated cart.

2. The structure of claim 1 characterized in that the links carrying said swivel wheels have their inner pivots positioned rearwardly of the axes of the axles of the wheels.

3. In a telescoping cart assembly for telescopic association with another cart of similar construction, said cart including a frame, a basket carried by the frame having a hinged rear gate and forwardly converging sidewalls, said frame including spaced side frame structures, fixed wheels mounted at the rear end of the frame, swiveled casters supporting the front end of the frame, the invention comprising means mounting the swiveled casters to the front of the frame including a supporting bracket, swinging links mounted on the supporting bracket, and means supporting the swiveled casters on the free end portions of said links, whereby said swiveled casters may be moved laterally with said links to modify their lateral spacing upon engagement with parts of an associated cart.

4. The structure of claim 3 characterized in that the links are mounted on bearings carried on pivot pins depending from the supporting structure.

5. In a telescoping cart assembly including a supporting frame and a basket carried thereby, said basket including forwardly tapered sidewalls and a rear hinged gate, supporting wheels for said cart, said supporting wheels including a pair of laterally spaced rear wheels fixed to said frame with their axes at right angles to the center line of the frame, and a pair of swivel wheels at the front end of the frame, said swivel wheels being positioned inwardly of the rear wheels, whereby the front of one cart assembly is capable of telescopic association with a cart of similar construction and when so associated the front swivel wheels of the inner cart extend forwardly of the rear wheels of the outer cart, the invention comprising means mounting the front wheels on said frame including links hingedly mounted at their inner ends on said frame for horizontal swinging movement, swivel means for supporting said front wheels at the outer end portions of said links, pins forming stop means carried by the frame and extending in the path of movement of said links, whereby the front wheels are movable inwardly and outwardly with said links to positions determined by the location of said stop means.

6. In a telescoping cart assembly including a supporting frame and a basket carried thereby, said basket including forwardly tapered sidewalls and a rear hinged gate, supporting wheels for said cart, said supporting wheels including a pair of laterally spaced rear wheels fixed to said frame with their axes at right angles to the center line of the frame, and a pair of swivel wheels at the front end of the frame, said swivel wheels being positioned inwardly of the rear wheels, whereby the front of one cart assembly is capable of telescopic association with a cart of similar construction and when so associated the front swivel wheels of the inner cart extend forwardly of the rear wheels of the outer cart, the invention comprising supporting means for said front swivel wheels including a transverse support fixed to the supporting frame, pivot pins carried by said transverse support, links mounted on said pivot pins for horizontal swinging movement, swivel wheel mountings at the free ends of said links for supporting said front wheels, whereby said wheels are laterally movable by movement of said links and are free to rotate about their swivel mountings.

7. The structure of claim 6 characterized in that stop means are carried at the outer end of said transverse support and project downwardly in the path of movement of said links to limit the outward movement of said links.

8. The structure of claim 6 characterized in that stop means are carried at the outer end of said transverse support and project downwardly in the path of said links to limit the outward movement of said links and central stop means are carried by the medial portion of said transverse support for limiting the inward swinging movement of said links.

9. The structure of claim 6 characterized in that the means mounting the front wheels on the frame include vertical pins having spaced bearings between which the inner ends of the links are hingedly mounted.

References Cited in the file of this patent

UNITED STATES PATENTS

| | | |
|---|---|---|
| 1,283,166 | Harper | Oct. 29, 1918 |
| 1,429,216 | Arwine | Sept. 19, 1922 |
| 1,467,453 | Remacle | Sept. 11, 1923 |
| 2,639,161 | Goldman | May 19, 1953 |